(12) United States Patent
Wilcox

(10) Patent No.: US 11,529,919 B2
(45) Date of Patent: Dec. 20, 2022

(54) RESTRAINT SYSTEM FOR AN AMUSEMENT PARK ATTRACTION

(71) Applicant: Universal City Studios LLC, Universal City, CA (US)

(72) Inventor: Rachel Sarah Wilcox, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 402 days.

(21) Appl. No.: 16/787,768

(22) Filed: Feb. 11, 2020

(65) Prior Publication Data
US 2021/0229613 A1 Jul. 29, 2021

Related U.S. Application Data

(60) Provisional application No. 62/966,432, filed on Jan. 27, 2020.

(51) Int. Cl.
| | | |
|---|---|---|
| *B60R 21/00* | (2006.01) | |
| *B60R 21/02* | (2006.01) | |
| *A63G 7/00* | (2006.01) | |
| *A63G 31/02* | (2006.01) | |
| *A63G 4/00* | (2006.01) | |
| *A63G 31/16* | (2006.01) | |
| *A63G 31/00* | (2006.01) | |

(52) U.S. Cl.
CPC .............. *B60R 21/00* (2013.01); *B60R 21/02* (2013.01); *A63G 4/00* (2013.01); *A63G 7/00* (2013.01); *A63G 31/02* (2013.01); *A63G 31/16* (2013.01); *A63G 2031/002* (2013.01); *B60R 2021/0097* (2013.01); *B60R 2021/028* (2013.01); *B60R 2021/0273* (2013.01)

(58) Field of Classification Search
CPC ........................ B60N 2/2839; B60R 2021/022
See application file for complete search history.

(56) References Cited

U.S. PATENT DOCUMENTS

| | | | | |
|---|---|---|---|---|
| 3,848,827 A | | 11/1974 | Tamarin | |
| 4,509,798 A | * | 4/1985 | Strothers | ................. B60R 21/02 |
| | | | | 297/487 |
| 4,770,468 A | * | 9/1988 | Shubin | ................. B60N 2/2875 |
| | | | | D6/333 |
| 5,286,091 A | * | 2/1994 | Busch | ..................... B60R 22/04 |
| | | | | 297/487 |

(Continued)

OTHER PUBLICATIONS

PCT/US2021/013674 International Search Report and Written Opinion dated Jun. 4, 2021.

*Primary Examiner* — James A English
(74) *Attorney, Agent, or Firm* — Fletcher Yoder P.C.

(57) ABSTRACT

A ride vehicle for an attraction of an amusement park includes a ride seat, a pivot adapter configured to rotate relative to the ride seat, a gear of the pivot adapter comprising a first set of teeth, a passenger restraint piece coupled to the pivot adapter and configured to rotate with the pivot adapter between a closed and an open position, and a cap having a second set of teeth. The cap is configured to be positioned to engage the gear of the pivot adapter such that the second set of teeth of the cap engages with the first set of teeth of the gear, and engagement between the second set of teeth and the first set of teeth substantially blocks movement of the pivot adapter relative to the ride seat in a rotational direction.

20 Claims, 7 Drawing Sheets

(56) References Cited

U.S. PATENT DOCUMENTS

| | | | | |
|---|---|---|---|---|
| 5,476,309 | A | * | 12/1995 | Chen ................ B60R 21/02 297/487 |
| 6,648,260 | B2 | | 11/2003 | Webber et al. |
| 6,948,605 | B1 | | 9/2005 | Gauthier |
| 8,141,955 | B1 | * | 3/2012 | Maassarani ........... B60N 2/882 297/393 |
| 9,216,676 | B1 | * | 12/2015 | Reyes Luna .......... B60N 2/986 |
| 9,340,180 | B2 | * | 5/2016 | Planer .................. B60R 22/00 |
| 2001/0030074 | A1 | * | 10/2001 | Sauermann ........... B60R 21/02 280/801.1 |
| 2005/0193782 | A1 | | 9/2005 | Beane et al. |
| 2005/0275275 | A1 | | 12/2005 | Muller et al. |
| 2009/0107819 | A1 | | 4/2009 | Samudrikam et al. |
| 2018/0065593 | A1 | | 3/2018 | Kovac |
| 2018/0312173 | A1 | | 11/2018 | Hall |
| 2019/0152359 | A1 | * | 5/2019 | Spahn ............... B60N 2/42745 |

* cited by examiner

RESTRAINT SYSTEM FOR AN AMUSEMENT PARK ATTRACTION

CROSS REFERENCE TO RELATED APPLICATIONS

This application claims priority from and the benefit of U.S. Provisional Application Ser. No. 62/966,432, entitled "RESTRAINT SYSTEM FOR AN AMUSEMENT PARK ATTRACTION" and filed Jan. 27, 2020, which is hereby incorporated by reference in its entirety for all purposes.

BACKGROUND

The present disclosure relates generally to amusement park attractions and, specifically, to a restraint control system for an amusement park attraction.

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

Amusement parks include various features that entertain guests. For example, an amusement park may have rides, shows, and/or effects to provide a desirable experience to different guests. Some of these features may include a ride vehicle in which guests may be situated during operation of the attraction. For instance, the ride vehicle may have seats that the guests occupy, and restraints may be used to contain and secure the guests within the ride vehicle. It is now recognized that there is a need for improved restraints.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a ride vehicle for an attraction of an amusement park includes a ride seat, a pivot adapter configured to rotate relative to the ride seat, a gear of the pivot adapter comprising a first set of teeth, a passenger restraint piece coupled to the pivot adapter and configured to rotate with the pivot adapter between a closed and an open position, and a cap having a second set of teeth. The cap is configured to be positioned to engage the gear of the pivot adapter such that the second set of teeth of the cap engages with the first set of teeth of the gear, and engagement between the second set of teeth and the first set of teeth substantially blocks movement of the pivot adapter relative to the ride seat in a rotational direction.

In one embodiment, a restraint system for a ride vehicle of an amusement park includes a gear rotatably coupled to a pivot of the restraint system, in which the gear comprises a first set of teeth. The restraint system further includes a cap having a second set of teeth and an actuator configured to move the cap relative to the gear. The actuator is configured to move the cap to engage the second set of teeth of the cap with the first set of teeth of the gear, and the actuator is configured to move the cap to disengage the second set of teeth with the first set of teeth. The cap is coupled to the ride vehicle such that engagement between the second set of teeth and the first set of teeth substantially blocks rotation of the gear relative to the pivot in a rotational direction.

In one embodiment, a ride vehicle for an attraction of an amusement park includes a pivot and a pivot adapter having a gear rotatably coupled to the pivot, in which the gear comprises a first set of teeth. The ride vehicle also includes a restraint piece coupled to the pivot adapter, in which the restraint piece is configured to rotate about the pivot between an open position and a closed position via rotation of the gear about the pivot. The ride vehicle further includes a restraint control assembly that has a cap comprising a second set of teeth and an actuator configured to move the cap relative to the gear. The restraint control assembly is adjustable between a first configuration and a second configuration, the second set of teeth of the cap is engaged with the first set of teeth of the gear in the first configuration to substantially block movement of the restraint piece from the closed position to the open position, and the second set of teeth is disengaged with the first set of teeth in the second configuration to enable the restraint piece to move between the open position and the closed position.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, in which.

DETAILED DESCRIPTION

Figure 1:
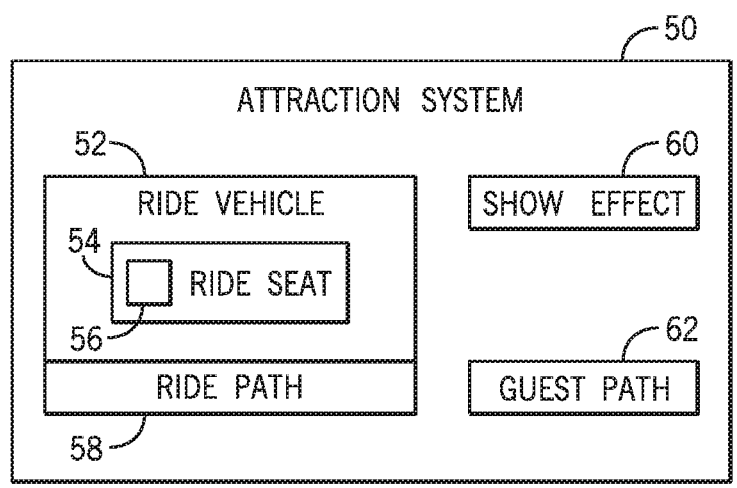
FIG. 1 is a schematic diagram of an embodiment of an attraction system having a ride vehicle and a ride seat with a restraint system, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure relates to an attraction system having a restraint control system used for selectively blocking rotation of a component of the attraction system. For instance, the attraction system may include a ride vehicle having seats and restraints for each seat. In an embodiment, the restraint is configured to rotate between an open position and a closed position. In the open position, the restraint may enable a guest to enter the ride vehicle to occupy the seat and/or to leave the seat to exit the ride vehicle. Accordingly, the restraint may be in the open position at a station or loading platform of the attraction system so as to load guests onto and unload guests from the ride vehicle. In the closed position, such as when the ride vehicle is in motion, the restraint may contain (e.g., fasten) the guests within the ride vehicle. As used herein, the closed position refers to a position of the restraint that effectively secures the guest within the ride vehicle. Since each guest may have a different characteristic, such as a different body size, weight, body shape, and so forth, different restraints that secure different guests may also have dissimilar positions that may be considered closed positions. Indeed, the same restraint may have various suitable closed positions at different times of operation of the attraction system based on the guest to be secured by the restraint at a particular time of operation.

During operation of the attraction system, such as when the ride vehicle is in motion, the restraint may be maintained in the closed position to secure the guests within the ride vehicle. To this end, the restraint may have a locking mechanism. However, it may be difficult to implement a locking mechanism in the ride vehicle. For example, the locking mechanism may include a linkage system that has components, such as one or more gears, one or more shafts, one or more hinges, and so forth, that may effectively block movement of the restraint and lock the restraint in the second position. The linkage system may be designed to have sufficient strength and withstand movement of the ride vehicle so as to provide enough force for blocking movement of the restraint during operation of the attraction system. However, such a design of the locking system may substantially increase a weight of the ride vehicle and/or be difficult to install within a confined space or volume of the ride vehicle.

Thus, it is presently recognized that an improved system that blocks movement of the restraint may facilitate efficient operation and/or manufacture of the attraction system. Accordingly, embodiments of the present disclosure are directed to a system that may directly block rotation of a restraint. In one embodiment, the restraint may be configured to rotate about a pivot. The restraint may have a gear, and the attraction system may include a cap coupled to an actuator and configured to engage the gear. The actuator is configured to move the cap to engage with the gear to block rotation of the restraint about the pivot, and the actuator is configured to move the cap to disengage with the gear to enable rotation of the restraint about the pivot. By way of example, the gear has a first set of teeth and the cap has a second set of teeth. In an engaged position, the second set of teeth may engage with the first set of teeth to block movement of the first set of teeth relative to the second set of teeth, thereby blocking the gear and the restraint from rotating about the pivot to secure the position of the restraint (e.g., in the closed position). In a disengaged position, the second set of teeth are not engaged with the first set of teeth, and the restraint may rotate about the pivot (e.g., to rotate between the closed position and the open position). Thus, the actuator may enable and block rotation of the restraint.

Engagement between the cap and the gear, as described herein, may sufficiently provide enough force or resistance to block rotation of the gear about the pivot. Furthermore, the actuator may be used to move the cap to engage with or disengage with the gear without the use of a linkage system or other components. As used herein, a linkage system includes components that enable an actuator or other movable feature to indirectly couple to a component configured to engage with the gear. Accordingly, the linkage system may transfer movement of the actuator to cause movement of the component (i.e., movement of the actuator does not cause direct movement of the component) to engage or disengage with the gear. For example, the linkage system may include one or more additional gears, one or more additional actuators, one or more bars or levers, one or more pivots or hinges, and the like, that indirectly couples the actuator to the component. By directly coupling the actuator with the cap without the use of a linkage system, the restraint system may not substantially increase the weight of the ride vehicle and/or may be implemented within a limited space of the ride vehicle. Accordingly, the restraint system may improve the efficiency of operation and/or manufacture of attraction systems.

Turning now to the drawings, FIG. 1 is a schematic diagram of an embodiment of an attraction system 50, which may be a roller coaster, a dark ride, a drop tower, or any other suitable attraction system 50. The attraction system 50 may have a ride vehicle 52 in which guests may be situated during operation of the attraction system 50. For example, the ride vehicle 52 may have one or more ride seats 54 that guests may occupy within the ride vehicle 52. In an embodiment, the ride seat 54 may further include a restraint system 56 having features described herein. The restraint system 56 is configured to secure one or more guests within the ride vehicle 52. By way of example, the ride vehicle 52 may be configured to move along a ride path or track 58 of the attraction system 50, and the guests may be contained within the ride vehicle 52 by the restraint system 56 during movement of the ride vehicle 52.

The attraction system 50 may also include show effects 60 that further enhance the experience of the guests. The show effects 60 may include lighting, sounds, animated figures, and the like, that provide additional features to entertain the guests. In an embodiment, the attraction system 50 may also include a guest path 62 that guests may use to navigate within the attraction system 50, such as from an entrance of the attraction system 50 to the ride vehicle 52 and/or from the ride vehicle 52 to an exit of the attraction system 50. As an example, the guest path 62 may include a footpath (e.g., a queue line), a staircase, an escalator, an elevator, and so forth. The show effects 60 may provide entertainment for the guests as they navigate the guest path 62 in the attraction system 50 such that the guests may also be entertained while waiting within the attraction system 50 (e.g., when not in the ride vehicle 52).

Figure 2:
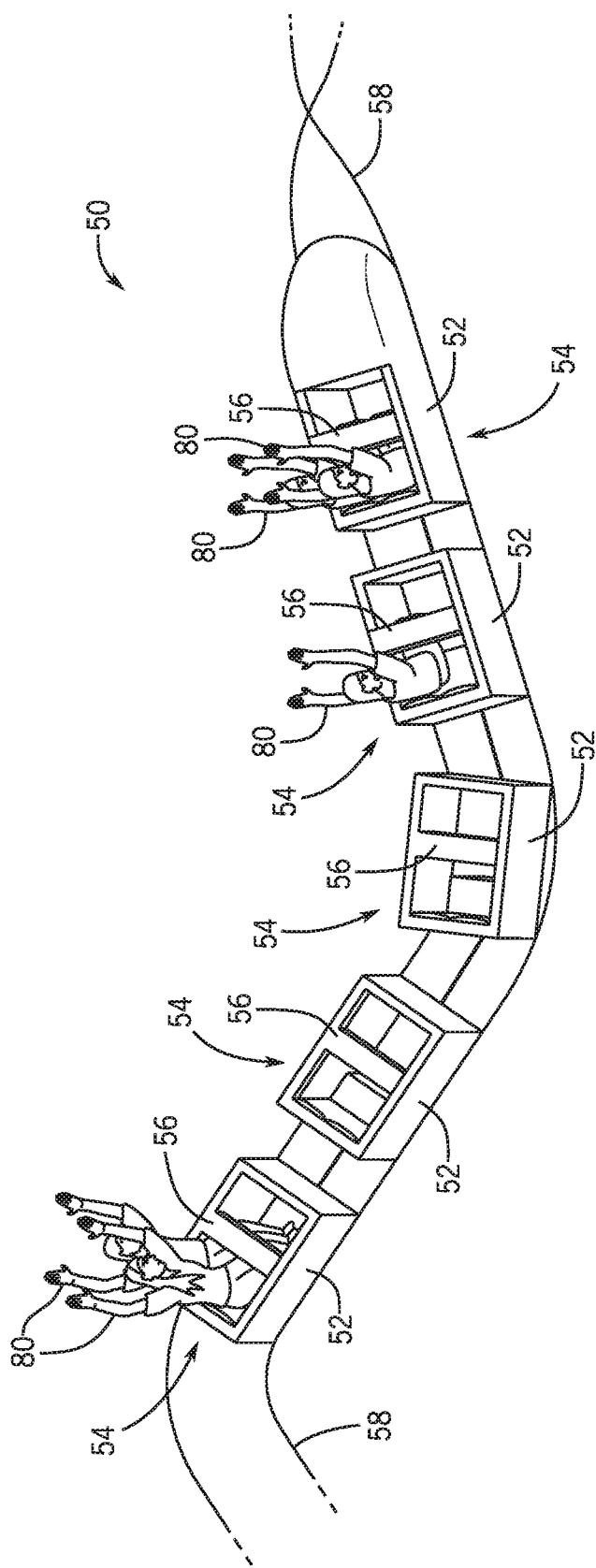
FIG. 2 is a side perspective view of an embodiment of an attraction system having a ride vehicle and a ride seat with a restraint system, in accordance with an aspect of the present disclosure.

FIG. 2 is a side perspective view of an embodiment of the attraction system 50. In the illustrated embodiment, the attraction system 50 includes multiple ride vehicles 52 coupled together (e.g., via a link) and configured to travel along the ride path 58. For instance, the ride path 58 may be a track that guides the movement (e.g., direction, speed, and/or orientation) of the ride vehicle 52 through the attraction system 50. In an additional or an alternative embodiment, the ride path 58 may be an open surface through which the ride vehicle 52 may generally travel (e.g., be guided based on a user input).

Each ride vehicle 52 also includes one or more ride seats 54 that each may hold one or more passengers 80. For example, the illustrated attraction system 50 shows five ride vehicles 52 that each accommodate two passengers 80, but the attraction system 50 may include any suitable number of ride vehicles 52, such as one, two, four, ten, twenty, or any number of ride vehicles 52, and each ride vehicle 52 may accommodate any number of passengers 80, such as one passenger 80, three passengers 80, four passengers 80, or five or more passengers 80. Indeed, there may be any suitable number of ride vehicles and/or passengers in each of the ride vehicles 52.

Each ride vehicle 52 may include the restraint system 56. The illustrated restraint system 56 is configured to be positioned above the lap of each passenger 80. However, an additional or alternative restraint system 56 may have any configuration of restraint system 56, such as a restraint system 56 configured to be positioned over a shoulder of each passenger 80, across a torso of each passenger 80, and so forth. Furthermore, the illustrated attraction system 50 includes a single restraint system 56 implemented within each ride vehicle 52. Additionally or alternatively, each ride vehicle 52 may have any suitable number of restraint systems 56, such as one for each passenger 80 or multiple for each passenger 80 (e.g., restraints for each of a passenger's legs, torso, lap and so forth).

Moreover, each restraint system 56 may be adjustable, such as to move between a first position and a second position. The first position may enable passengers 80 to enter and/or exit the ride vehicle 52. Furthermore, the second position may secure the passengers 80 within the ride vehicle 52. As described herein, the restraint system 56 may be secured in the second position, such as via a locking system, in order to hold the passengers 80 within the ride vehicle 52 (e.g., while the ride vehicle 52 is moving along the ride path 58).

Figure 3:
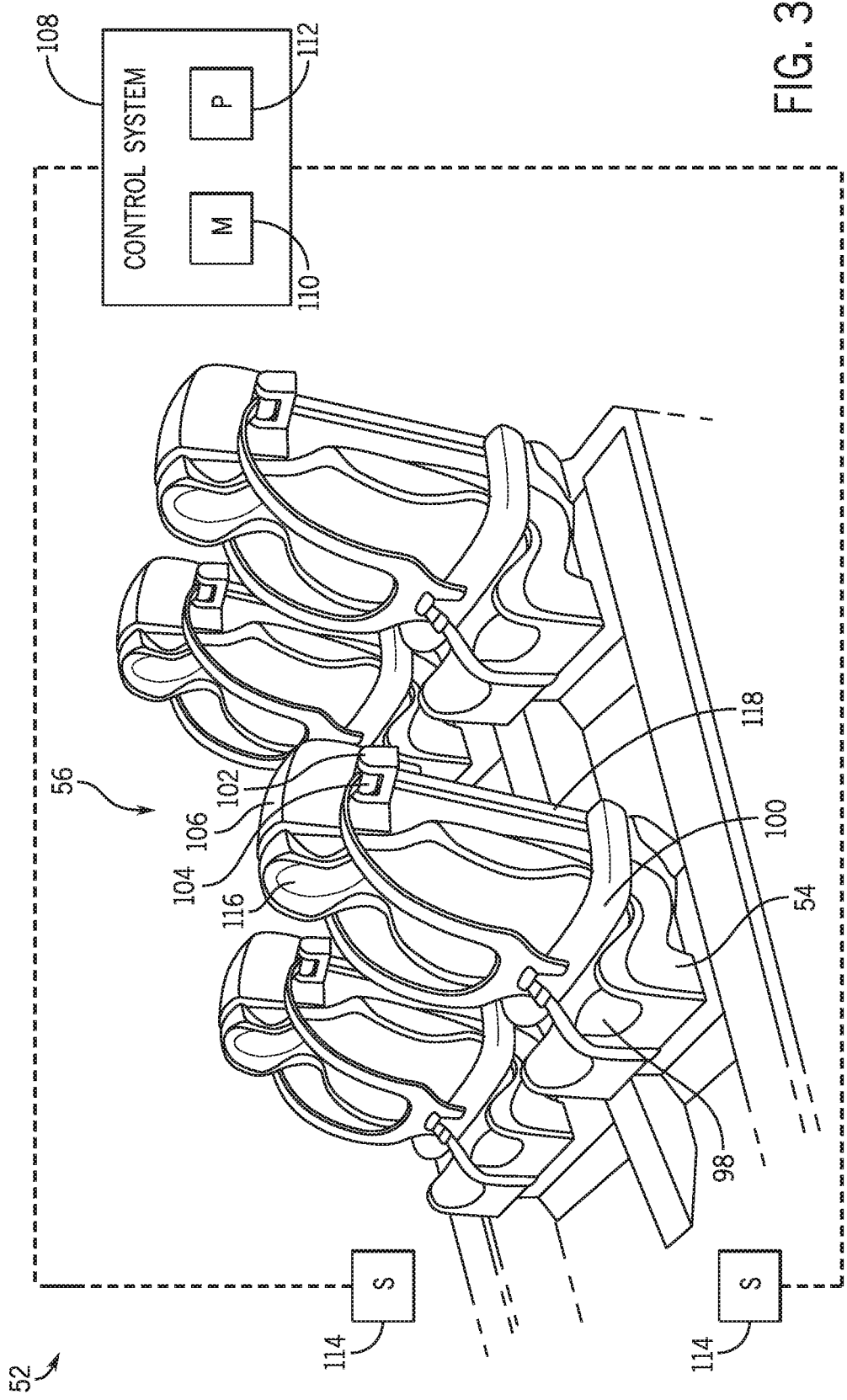
FIG. 3 is a side perspective view of an embodiment of a ride vehicle having multiple restraint systems that are each configured to secure passengers in a respective ride seat, in accordance with an aspect of the present disclosure.

FIG. 3 is a side perspective view of an embodiment of the ride vehicle 52 having multiple restraint systems 56 configured to secure passengers in respective ride seats 54, such as onto seating portions 98 on which each passenger is seated.

In the illustrated embodiment, the restraint system 56 includes a restraint piece 100, which may include tubing and/or bars, in a closed position, in which the restraint piece 100 (e.g., an over the shoulder restraint) extends over the shoulders of one of the passengers 80 and/or across the torso (e.g., the waist) of the passenger 80 to contain the passenger 80 within the ride vehicle 52. The restraint system 56 also includes a pivot 102 and a pivot adapter 104 coupling the restraint piece 100 to the pivot 102. The pivot adapter 104 may be fixably coupled to the restraint piece 100, and the pivot adapter 104 may be rotatably coupled to the pivot 102. Thus, the pivot adapter 104 may be configured to rotate about the pivot 102, thereby rotating the restraint piece 100 about the pivot 102. For example, the pivot adapter 104 may enable the restraint piece 100 to rotate between the closed position and the open position.

The restraint system 56 further includes a restraint control assembly 106 configured to block movement of the pivot adapter 104 about the pivot 102. Therefore, the restraint control assembly 106 may also block movement (e.g., rotational movement) of the restraint piece 100 relative to the pivot 102 and relative to the ride seat 54 (e.g., relative to the seating portions 98). Accordingly, the restraint control assembly 106 may secure the restraint piece 100 in the closed position and secure the passenger in the ride seat 54. The restraint control assembly 106 is also adjustable to enable movement of the pivot adapter 104 about the pivot 102. Thus, the restraint control assembly 106 may also enable the restraint piece 100 to move between the closed position and the open position. For example, the restraint control assembly 106 may be adjustable between a first configuration and a second configuration. In the first configuration, the restraint control assembly 106 may enable movement of the pivot adapter 104 about the pivot 102. As such, the restraint piece 100 may be movable to enable the passenger to enter or exit the ride seat 54. In the second configuration, the restraint control assembly 106 may block movement of the pivot adapter 104 about the pivot 102. By way of example, the restraint control assembly 106 may engage part of the pivot adapter 104 to block rotational movement of the pivot adapter 104 relative to the pivot 102. Accordingly, the position of the restraint control assembly 106 may be substantially fixed about the pivot 102 and the ride seat 54 (e.g., to secure the passenger in the ride seat 54).

To this end, the ride vehicle 52 may include or may be communicatively coupled to a control system 108. The control system 108 may have a memory 110 and a processor 112. The memory 110 may include volatile memory, such as random access memory (RAM), and/or non-volatile memory, such as read-only memory (ROM), optical drives, hard disc drives, solid-state drives, or any other non-transitory computer-readable medium that includes instructions to operate the ride vehicle 52, such as the restraint control assembly 106. The processor 112 may include one or more application specific integrated circuits (ASICs), one or more field programmable gate arrays (FPGAs), one or more general purpose processors, or any combination thereof. In an embodiment, the control system 108 may also include a user interface, such as a touch screen, a trackpad, a button, a switch, another suitable component, or any combination thereof, with which a user (e.g., an operator of the ride vehicle 52) may interact, and the control system 108 may operate the ride vehicle 52 based on the interaction.

The control system 108 may operate the restraint control assembly 106 to enable or block movement of the pivot adapter 104 about the pivot 102. Thus, the control system 108 may also enable or block rotation of the restraint piece 100 about the pivot 102. For instance, the control system 108 may adjust the restraint control assembly 106 between the first configuration and the second configuration. In one embodiment, the control system 108 may be configured to set the configuration of the restraint control assembly 106 based on a time of operation of the ride vehicle 52 or of the attraction system that includes the ride vehicle 52. As an example, at certain times of operation (e.g., when the ride vehicle 52 is at a station), the control system 108 may set the restraint control assembly 106 in the first configuration to enable the restraint piece 100 to move and enable passengers to enter and/or exit the ride vehicle 52. At other times of operation (e.g., when the ride vehicle 52 is in motion), the control system 108 may set the restraint control assembly 106 in the second configuration to block movement of the restraint piece 100 (e.g., in the closed position) to secure the passenger within the ride vehicle 52.

In an additional or an alternative embodiment, the control system 108 may set the configuration of the restraint control assembly 106 based on a detected operating parameter of the ride vehicle 52. To this end, the control system 108 may be communicatively coupled to one or more sensors 114, which may be part of the ride vehicle 52, the ride path, or another part of the attraction system. The sensor(s) 114 may be configured to monitor the operating parameter of the ride vehicle 52 and to transmit feedback indicative of the operating parameter. In an example, the operating parameter includes a position of the ride vehicle 52 along the ride path. For instance, the control system 108 may set the restraint control assembly 106 in the first configuration when the operating parameter indicates the ride vehicle 52 is at the station (e.g., a loading and/or unloading platform). The control system 108 may then set the restraint control assembly 106 in the second configuration when the operating parameter indicates the ride vehicle 52 is moving and/or is not at the station. In other examples, the operating parameter may include a position of each passenger in the ride vehicle 52 (e.g., whether the passengers are situated in the ride seats 54 and/or on the seating portions 98), an operating mode of the ride vehicle 52, another suitable operating parameter, or any combination thereof.

In a further embodiment, the control system 108 may set the configuration of the restraint control assembly 106 based on user input. Therefore, in response to a user input indicative that the restraint piece 100 is to be movable relative to the pivot 102 and to the ride seat 54, the control system 108 may set the restraint control assembly 106 in the first configuration. However, in response to another user input indicative that the position of the restraint piece 100 is to be fixed relative to the pivot 102 and to the ride seat 54, the control system 108 may set the restraint control assembly 106 in the second configuration. Therefore, the control system 108 enables the user to select whether the restraint piece 100 is movable about the pivot 102 or fixed relative to the pivot 102. The user may be a ride operator and/or a passenger. If the user is only a ride operator, access to an input device (e.g., a button or switch) for controlling the restraint control assembly 106 may be located in a position that is accessible to the rider operator but not the passenger.

It should be noted that the illustrated restraint control assembly 106 is positioned adjacent to the pivot 102 and the pivot adapter 104 such that the restraint control assembly 106 may directly engage with the pivot 102 and/or the pivot adapter 104 without the implementation of additional components (e.g., a linkage system). To this end, the restraint control assembly 106 is positioned behind a head support 116 of the ride seat 54, such as onto an upper portion of a support 118 that is behind the ride seat 54. However, in an additional or an alternative embodiment, the restraint control assembly 106 may be positioned in another suitable location in the ride vehicle 52. In an example, for an embodiment in which the pivot 102 is located near the feet of the passengers (e.g., for a lap bar type restraint), the restraint control assembly 106 may be positioned in front of the corresponding ride seat 54. Indeed, the restraint control assembly 106 may be at any suitable position in the ride vehicle 52 to engage with the pivot 102 and/or the pivot adapter 104 directly.

Furthermore, although the illustrated ride vehicle 52 is for a roller coaster type ride in FIGS. 2 and 3, the ride vehicle 52 may be for any suitable attraction system. For example, the ride vehicle 52 may be for a dark ride, a motion simulator, a scrambler, or any other suitable ride, and the ride vehicle 52 may have the restraint piece 100 for securing passengers in the ride vehicle 52. The restraint control assembly 106 may also be implemented into such embodiments of the ride vehicle 52 to set the position of the restraint piece 100.

Figure 4:
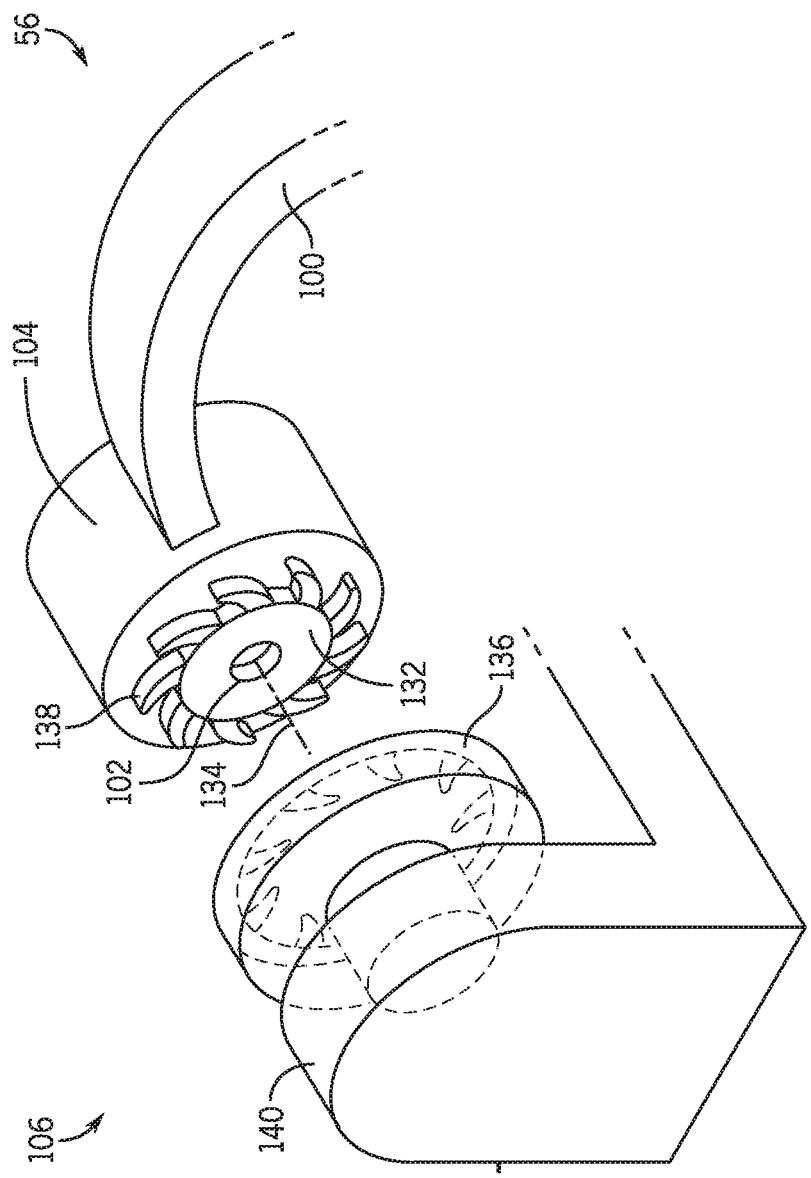
FIG. 4 is a partial side perspective view of an embodiment of a restraint system configured to control movement of a restraint tubing of a ride vehicle, in accordance with an aspect of the present disclosure.

FIG. 4 is a partial side perspective view of an embodiment of the restraint system 56 that may be implemented into the ride vehicle 52, such as into one of the ride seats 54. The restraint system 56 includes the restraint piece 100, the pivot 102, the pivot adapter 104, and the restraint control assembly 106. As illustrated, the pivot 102 may be a shaft, pin, or rod, and a portion of the pivot adapter 104 may be concentrically coupled to the pivot 102 such that the pivot adapter 104 may rotate about a rotational axis 134 around the pivot 102. For instance, the pivot adapter 104 may include a gear 132 through which the pivot 102 may be inserted, and the gear 132 may rotate about the rotational axis 134 to enable the pivot adapter 104 and the restraint piece 100 to rotate about the rotational axis 134.

The restraint control assembly 106 may include a cap 136 configured to fit over the gear 132 in order to block rotation of the gear 132 about the pivot 102. As an example, the gear 132 may have a first set of teeth 138, and the cap 136 may be configured to engage the first set of teeth 138 to block rotation of the gear 132 about the pivot 102. However, in the illustrated embodiment, the cap 136 is not engaged with the gear 132 (e.g., the restraint control assembly 106 is in the first configuration) and therefore, the gear 132 and the pivot adapter 104 may rotate about the pivot 102. In an embodiment, the restraint control assembly 106 may also include an actuator 140 configured to move the cap 136 relative to the gear 132. For example, the actuator 140 may be a linear actuator configured to translate (e.g., linearly translate) the cap 136 along the rotational axis 134 or along another axis that is substantially parallel to the rotational axis 134 to move the cap 136 relative to the gear 132. In one embodiment, the actuator 140 may include a solenoid that is actuated upon receiving an electrical signal, such as from the control system. The actuator 140 may move the cap 136 based on whether the electrical signal is received. For instance, in an energized state in which the actuator 140 is receiving the electrical signal, the actuator 140 may move the cap 136 toward the gear 132 to cover the gear 132 (e.g., in the second configuration of the restraint control assembly 106), thereby blocking movement of the gear 132 relative to the pivot 102. However, in a de-energized state in which the actuator 140 is not receiving the electrical signal, the actuator 140 may move the cap 136 away from the gear 132 such that the cap 136 does not cover the gear 132 (e.g., in the first configuration of the restraint control assembly 106), thereby enabling movement of the gear 132 relative to the pivot 102.

Alternatively, in the energized state, the actuator 140 may move to disengage the cap 136 with the gear 132, and in the de-energized state, the actuator 140 may move to engage the cap 136 with the gear 132. Moreover, the actuator 140 may be any suitable type of actuator (e.g., hydraulic actuator, pneumatic actuator) that may move the cap 136 in any suitable manner to engage with or disengage with the gear 132 so as to enable or block movement of the gear 132 about the pivot 102.

In the illustrated embodiment, the pivot adapter 104 includes a single gear 132 located at a particular side (e.g., an interior side) of the pivot adapter 104, and the restraint control assembly 106 includes a single actuator 140 configured to engage and disengage the cap 136 with the gear 132. In an additional or an alternative embodiment, the pivot adapter 104 may include another gear 132 located at another side (e.g., an exterior side) of the pivot adapter 104, and the restraint control assembly 106 may be positioned accordingly to engage and disengage the cap 136 with the gear 132. In a further embodiment, the pivot adapter 104 may include multiple gears 132 (e.g., at different sides of the pivot adapter 104), and multiple actuator 140 may be implemented to engage and disengage a respective cap 136 with each gear 132.

Figure 5:
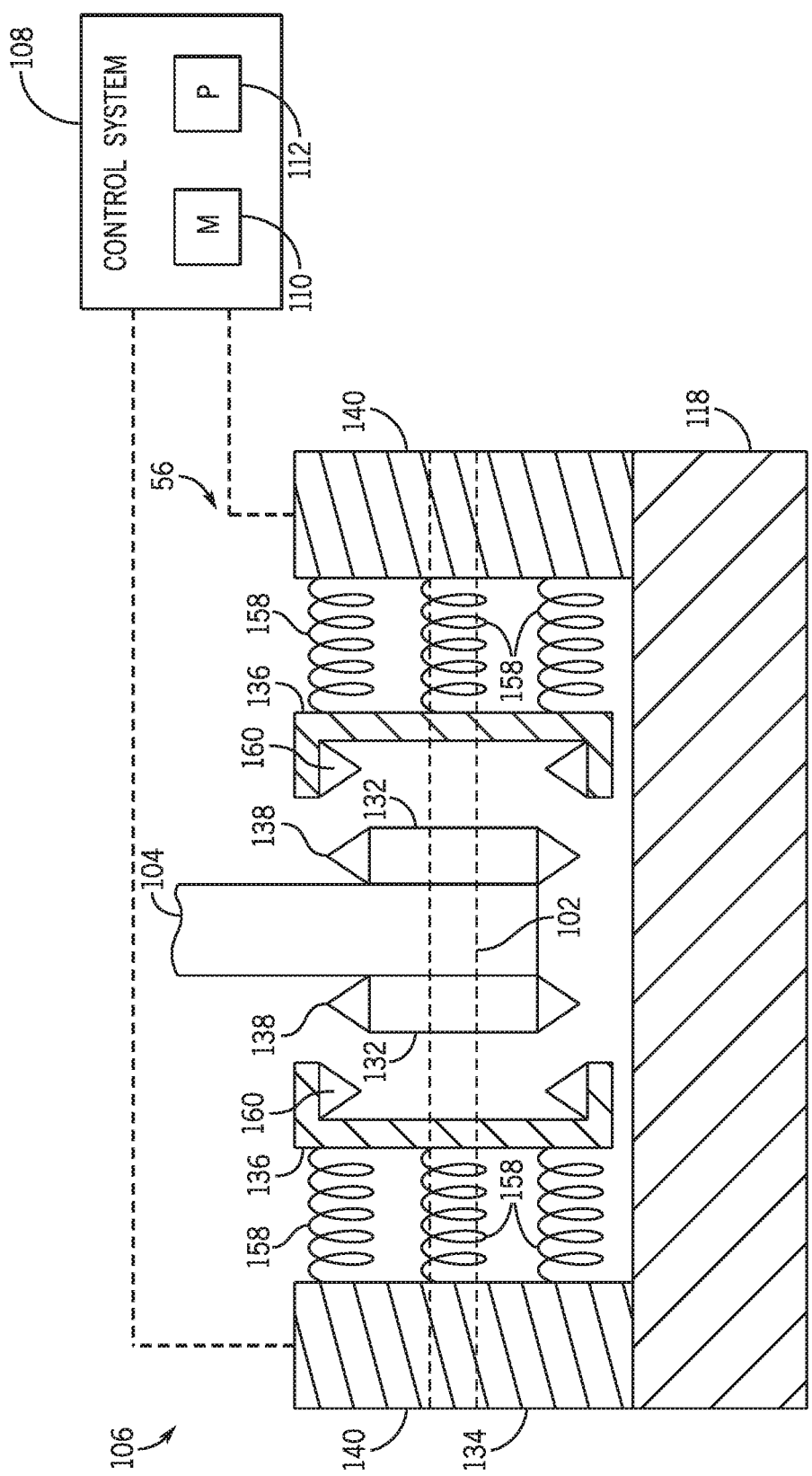
FIG. 5 is a schematic section view of an embodiment of a restraint control assembly in a configuration to enable movement of a restraint tubing about a pivot, in accordance with an aspect of the present disclosure.

FIG. 5 is a schematic section view of an embodiment of the restraint control assembly 106 in the first configuration to enable movement of the pivot adapter 104 about the pivot 102. In the illustrated embodiment, the pivot adapter 104 includes two gears 132 positioned on the support 118 at opposite sides of the pivot adapter 104, and the restraint control assembly 106 therefore includes two actuators 140 that are each configured to move a respective cap 136 to engage and disengage with one of the gears 132. Each actuator 140 may include one or more extensions 158 (e.g., springs) coupled to a respective cap 136 and translatable along the rotational axis 134 to move the caps 136 along the rotational axis 134. For instance, the actuators 140 may move the respective extensions 158 relative to the gears 132, thereby moving the caps 136 relative to the gears 132. As an example, upon receiving a signal from the control system 108, the actuators 140 may move the extensions 158 toward one of the gears 132 to move a corresponding cap 136 along the support 118 to engage the cap 136 with one of the gears 132. When the signal is not received from the control system 108, the extensions 158 may move away from the associated gear 132, thereby moving the corresponding cap 136 along the support to disengage the cap 136 with the associated gear 132.

In the illustrated embodiment, in order to block movement (e.g., rotational movement) of the cap 136 relative to the actuator 140 and maintain the position of the gears 132, each actuator 140 may include multiple extensions 158 (e.g., each positioned about and connected to the cap 136 along a circumference or edge of the cap 136) to secure the position of the cap 136 and therefore the position of the gear 132 during operation of the attraction system 50 and/or movement of the ride vehicle. Further, in order to block movement of the pivot adapter 104 about the pivot, both actuators 140 may move the caps 136 to engage the respective gears 132. Accordingly, both gears 132 engage with one of the caps 136. Alternatively, it may be sufficient to engage only one of the caps 136 with the corresponding gear 132. Thus, one of the gears 132 may be engaged with one of the caps 136, while the other gear 132 may not be engaged with the other cap 136 in order to block movement of the pivot adapter 104 about the pivot. In this way, the control system 108 may operate each actuator 140 independently from one another.

As illustrated in FIG. 5, each cap 136 may also have a second set of teeth 160. When the caps 136 cover the corresponding gears 132, the second set of teeth 160 in the respective caps 136 may engage with the first set of teeth 138 of the gear 132. In particular, the second set of teeth 160 may be substantially fixed (e.g., does not rotate), and the first set of teeth 138 may abut the second set of teeth 160 such that the first set of teeth 138 also remains substantially fixed. As such, engagement between the first set of teeth 138 and the second set of teeth 160 may substantially block movement of the pivot adapter 104 about the pivot. Although this disclosure primarily discusses the caps 136 as covering (e.g., enclosing) the gears 132 when engaged with the gears 132, in additional or alternative embodiments, the caps 136 may be moved to engage the second set of teeth 160 with the first set of teeth 138 without covering the gears 132. By way of example, the extensions 158 may be directly coupled to individual teeth of the second set of teeth 160, and the actuator 140 may move the second set of teeth 160 to engage or disengage with the first set of teeth 138 without covering the gears 132.

Figure 6:
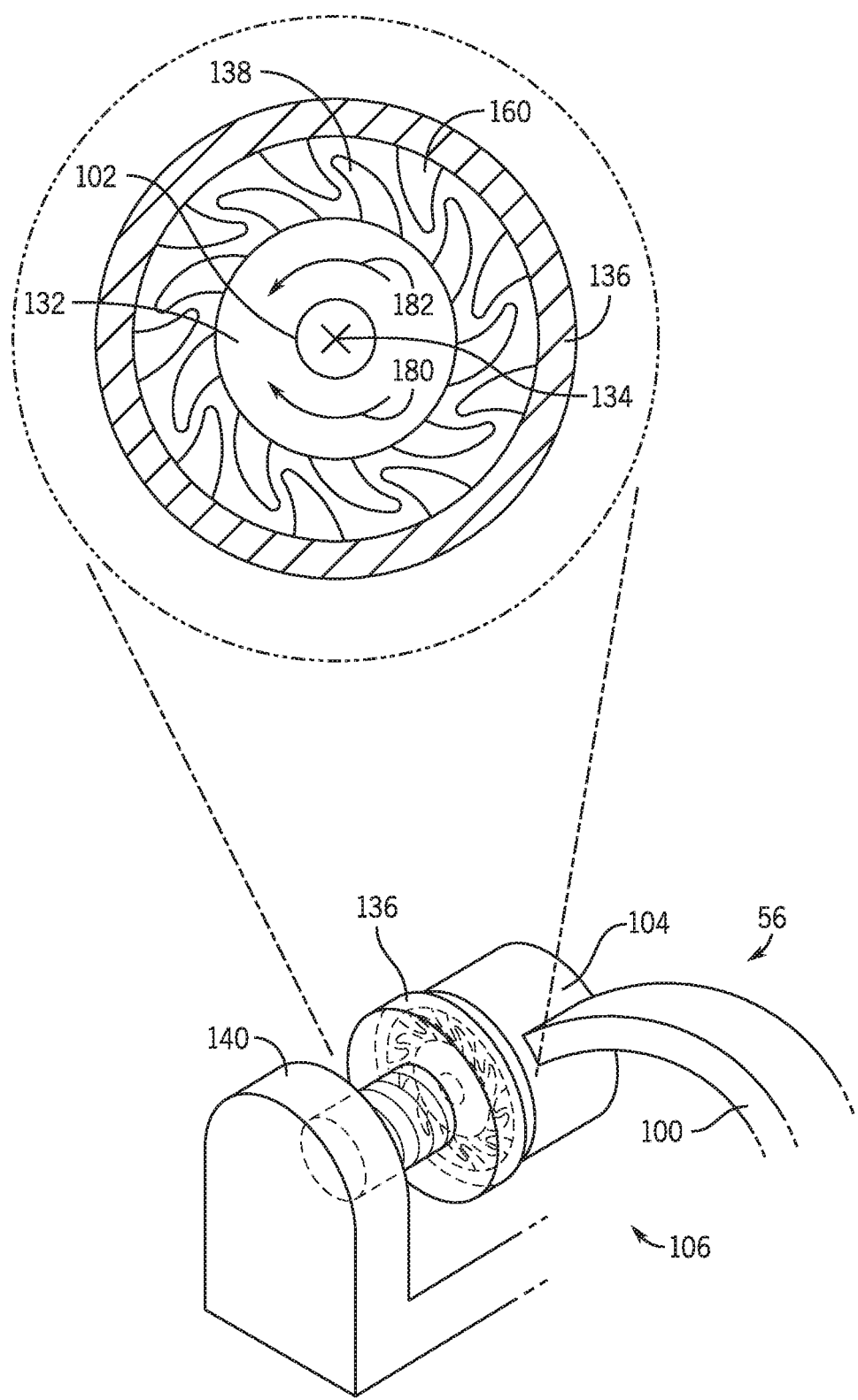
FIG. 6 is a detailed schematic cross-sectional view of an engagement between an embodiment of a cap and a gear in a restraint system, in accordance with an aspect of the present disclosure.

FIG. 6 is a detailed schematic cross-sectional view of an engagement between an embodiment of the cap 136 and the gear 132, such as in the second configuration of the restraint control assembly 106. Thus, the second set of teeth 160 of the cap 136 is engaged with the first set of teeth 138 of the gear 132. In the illustrated embodiment, the second set of teeth 160 includes enough teeth to abut each tooth of the first set of teeth 138. However, in an additional or an alternative embodiment, the second set of teeth 160 may have any suitable number of teeth, including one tooth, three teeth, five teeth, and so forth, to block movement of the gear 132 about the pivot 102.

Further, in the illustrated embodiment, each tooth of the first set of teeth 138 and each tooth of the second set of teeth 160 may be particularly shaped to block rotational movement of the gear 132 in a particular manner. For instance, the gear 132 may be a ratchet, and each tooth of the first set of teeth 138 may be angled, sloped, or bent. Additionally, each tooth of the second set of teeth 160 may also be angled, sloped, or bent, such as in a manner similar to a pawl. Such geometries of the first set of teeth 138 and the second set of teeth 160 may enable the gear 132 to rotate in one rotational direction but not another rotational direction about the pivot 102 when the cap 136 is engaged with the gear 132. Particularly, the illustrated gear 132 may be able to rotate in a first rotational direction 180 about the pivot 102. For example, rotation of the gear 132 in the first rotational direction 180 may cause the restraint piece 100 to move toward the ride seat (e.g., toward the seating portion) and the passenger, thereby providing greater securement of the passenger within the ride vehicle. However, the geometries of the first set of teeth 138 and the second set of teeth 160 may block the gear 132 from rotating in a second rotational direction 182 about the pivot 102. As an example, rotation of the gear 132 in the second rotational direction 182 may cause the restraint piece 100 to move away from the ride seat (e.g., away from the seating portion) and the passenger to move the restraint piece 100 toward the open position. Thus, the engagement between the gear 132 and the cap 136 may block movement of the restraint piece 100 toward the open position. Accordingly, the engagement between the gear 132 and the cap 136 may only enable the restraint piece 100 to rotate to provide securement and not release of the passenger.

It should be noted that moving the cap 136 along the rotational axis 134 and/or along an axis that is substantially parallel to the rotational axis 134 may enable the second set of teeth 160 to provide sufficient torque that blocks rotation of the gear 132 about the pivot 102. For example, the cap 136 that moves along the rotational axis 134 may provide greater torque in comparison with a single tooth (e.g., a single pawl) that moves in a direction that is perpendicular to the rotational axis 134, such in a radial direction of the gear 132. Moreover, such movement of the cap 136 may enable the restraint control assembly 106 to be positioned more proximate to the gear 132 and to engage the cap 136 with the gear 132 without the use of additional components. That is, the actuator 140 may be directly coupled to the cap 136, and the actuator 140 may enable the cap 136 to be directly engaged with the gear 132 (e.g., the first set of teeth 138 are directly engaged with the second set of teeth 160). Positioning the restraint control assembly 106 proximate to the gear 132 may also improve certain operating parameters associated with the restraint control assembly 106, such as the center of gravity, the moment of inertia, and the like, and further improve the design of the ride vehicle. For example, utilizing the cap 136 may reduce a complexity, an amount, and/or a weight of components used for blocking movement of the gear 132 about the pivot 102.

Figure 7:
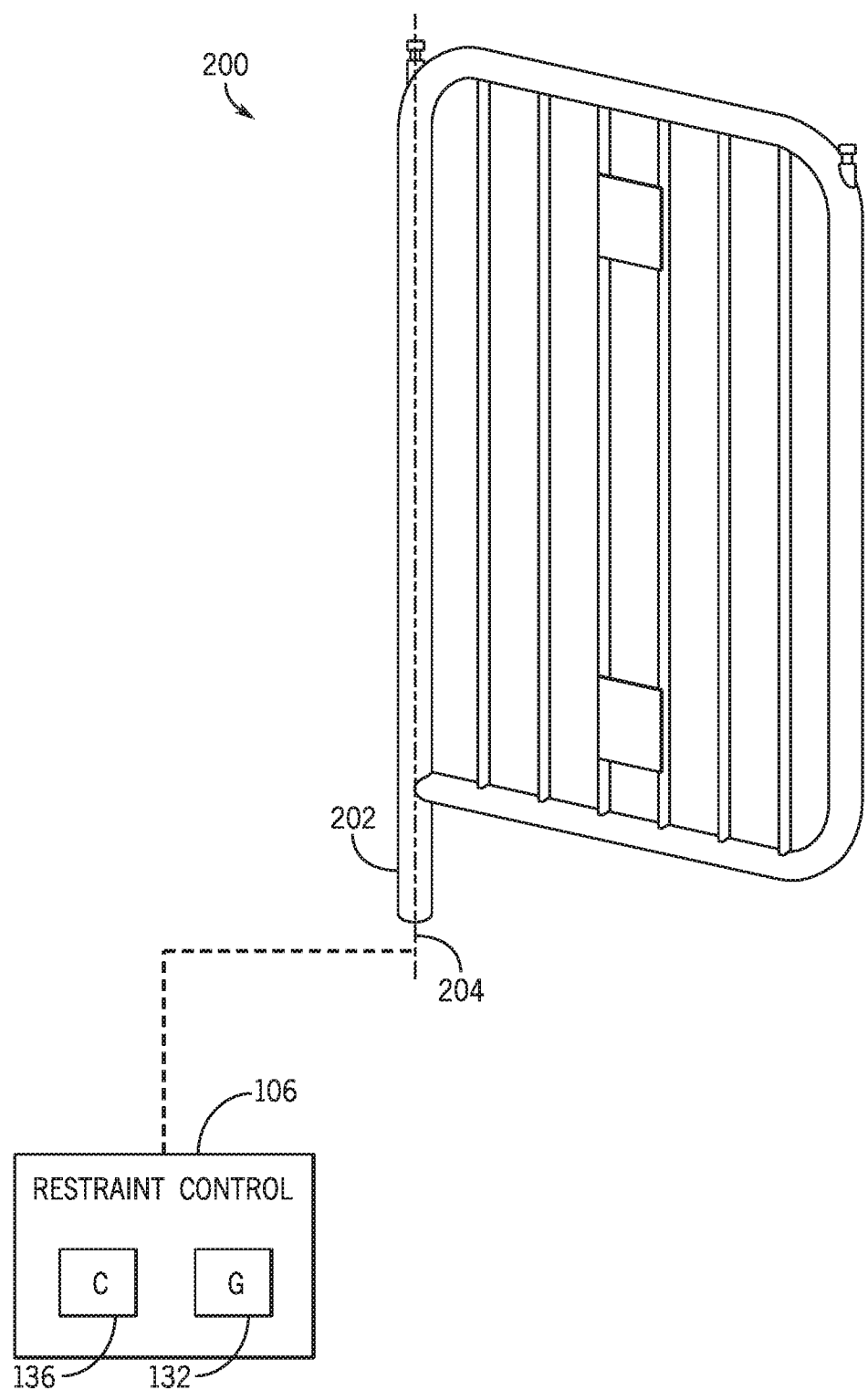
FIG. 7 is a perspective view of an embodiment of a restraint control assembly implemented to control movement of a feature, in accordance with an aspect of the present disclosure.

FIG. 7 is a perspective view of an embodiment of the restraint control assembly 106 implemented to control movement of a feature 200 (e.g., a moveable element). In FIG. 7, the feature 200 is representative of a gate. In one embodiment, the feature 200 may be implemented at the guest path of the attraction system to enable and block navigation through a portion of the guest path. For instance, the feature 200 may include a leg 202 that is rotatable about a rotational axis 204 extending along the leg 202. The feature 200 may rotate between a first position, which may enable guests to navigate the portion of the guest path, and a second position, which may block guests from navigating the portion of the guest path. The restraint control assembly 106 may be used for enabling and blocking rotation of the feature 200 about the rotational axis 204, such as to set the feature 200 in the first position or in the second position.

As an example, the feature 200 may have another gear, and the restraint control assembly 106 may include similar components as described above to enable or block movement of the gear of the feature 200 about the rotational axis 204. That is, the restraint control assembly 106 may have another actuator configured to move a corresponding cap to engage or disengage the cap with the gear of the feature 200. By way of example, if rotation of the feature 200 is desirable, such as to rotate the feature 200 from the first position to the second position or vice versa, the actuator of the restraint control assembly 106 may disengage the cap with the gear of the feature 200. However, if rotation of the feature 200 is not desirable, such as to maintain the feature 200 in the first position or the second position, the actuator may engage the cap with the gear of the feature 200. As such, the restraint control assembly 106 may enable rotational movement of the feature 200 and/or to set the position of the feature 200.

The restraint control assembly 106 may additionally or alternatively be used in any suitable application in which it is desirable to change rotational adjustability of a component. By way of example, the restraint control assembly 106 may be used in a show effect (e.g., to move an animated character), in a doorknob or door hinge (e.g., for locking or unlocking a door), in a turntable, and the like. Each of these features may be represented by feature 200, which while illustrated as a gate in FIG. 7, could also represent a portion of an animated character, a doorknob, or the like. Indeed, the restraint control assembly 106 may be implemented in any suitable component to adjust between enabling rotational movement of the component and blocking rotational movement of the component, such as to move and set a position of the component relative to a rotational axis.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride vehicle for an attraction of an amusement park, the ride vehicle comprising:
    a ride seat;
    a pivot adapter configured to rotate relative to the ride seat about a rotational axis;
    a gear of the pivot adapter, the gear being configured to rotate about the rotational axis, the gear comprising a first set of teeth, and the rotational axis extending through the pivot adapter and the gear;
    a passenger restraint piece coupled to the pivot adapter and configured to rotate with the pivot adapter about the rotational axis between a closed position and an open position;
    a cap comprising a second set of teeth, wherein the cap is configured to engage with the gear of the pivot adapter via relative movement between the cap and the gear of the pivot adapter along the rotational axis such that the second set of teeth of the cap engages with the first set of teeth of the gear, and wherein engagement between the second set of teeth and the first set of teeth substantially blocks movement of the pivot adapter relative to the ride seat in a rotational direction about the rotational axis.

2. The ride vehicle of claim 1, comprising an actuator configured to move the cap along the rotational axis relative to the gear to engage and disengage the second set of teeth with the first set of teeth.

3. The ride vehicle of claim 2, wherein the actuator is a linear actuator configured to move the cap along the rotational axis relative to the gear to engage the second set of teeth with the first set of teeth and to move the cap along the rotational axis relative to the gear to disengage the second set of teeth with the first set of teeth.

4. The ride vehicle of claim 2, comprising a control system communicatively coupled to the actuator, wherein the control system is configured to output a signal to cause the cap to move along the rotational axis relative to the gear.

5. The ride vehicle of claim 4, wherein the control system is configured to output the signal based on a time of operation of the attraction.

6. The ride vehicle of claim 2, wherein the passenger restraint piece is an over-the-shoulder restraint, wherein the ride seat comprises a head support, and wherein the actuator is positioned behind the head support.

7. The ride vehicle of claim 1, wherein the rotational direction is a first rotational direction, and wherein each tooth of the first set of teeth is angled and each tooth of the second set of teeth is angled such that the engagement between the second set of teeth and the first set of teeth enables movement of the pivot adapter relative to the ride seat in a second rotational direction, opposite the first rotational direction, about the rotational axis.

8. The ride vehicle of claim 7, wherein movement of the pivot adapter relative to the ride seat in the first rotational direction moves the passenger restraint piece away from a seating portion of the ride seat, and wherein movement of the pivot adapter relative to the ride seat in the second rotational direction moves the passenger restraint piece toward the seating portion of the ride seat.

9. A restraint system for a ride vehicle of an amusement park, the restraint system comprising:
a gear rotatably coupled to a pivot of the restraint system, wherein the gear comprises a first set of teeth, and the gear is configured to rotate about a rotational axis extending through the pivot and the gear;
a cap comprising a second set of teeth; and
an actuator configured to move the cap along the rotational axis relative to the gear, wherein the actuator is configured to move the cap along the rotational axis to engage the second set of teeth of the cap with the first set of teeth of the gear, wherein the actuator is configured to move the cap along the rotational axis to disengage the second set of teeth with the first set of teeth, and wherein the cap is coupled to the ride vehicle such that engagement between the second set of teeth and the first set of teeth substantially blocks rotation of the gear relative to the pivot in a rotational direction about the rotational axis.

10. The restraint system of claim 9, wherein the actuator is configured to linearly translate the cap along the rotational axis to move the cap relative to the gear.

11. The restraint system of claim 9, wherein the actuator is directly coupled to the cap, and the actuator is configured to move the cap along the rotational axis such that the second set of teeth is directly engaged with the first set of teeth.

12. The restraint system of claim 9, wherein the actuator is a solenoid actuator, wherein the actuator is configured to be in an energized state to move the cap along the rotational axis toward the gear in response to receiving a signal, and the actuator is configured to be in a de-energized state to move the cap along the rotational axis away from the gear when not receiving the signal.

13. The restraint system of claim 9, comprising a restraint piece and a pivot adapter coupling the restraint piece with the gear such that rotation of the gear about the pivot and the rotational axis causes rotation of the restraint piece about the pivot and the rotational axis to facilitate securement and release of a passenger in the ride vehicle.

14. A ride vehicle for an attraction of an amusement park, the ride vehicle comprising:
a pivot;
a pivot adapter comprising a gear rotatably coupled to the pivot, wherein the gear comprises a first set of teeth, and the pivot adapter and the gear are configured to rotate about a rotational axis extending through the pivot adapter and the gear;
a restraint piece coupled to the pivot adapter, wherein the restraint piece is configured to rotate about the rotational axis between an open position and a closed position via rotation of the gear about the pivot; and
a restraint control assembly, comprising:
a cap comprising a second set of teeth; and
an actuator configured to move the cap along the rotational axis relative to the gear;
wherein the restraint control assembly is adjustable between a first configuration and a second configuration, wherein the second set of teeth of the cap is engaged with the first set of teeth of the gear in the first configuration to substantially block movement of the restraint piece from the closed position to the open position, and wherein the second set of teeth is disengaged with the first set of teeth in the second configuration to enable the restraint piece to move between the open position and the closed position.

15. The ride vehicle of claim 14, wherein the actuator is configured to move the cap along the rotational axis to engage the second set of teeth with the first set of teeth and set the restraint control assembly in the first configuration, and wherein the actuator is configured to move the cap to disengage the second set of teeth with the first set of teeth and set the restraint control assembly in the second configuration.

16. The ride vehicle of claim 15, comprising a control system configured to output a signal to cause the actuator to move the cap along the rotational axis relative to the gear.

17. The ride vehicle of claim 16, comprising a sensor communicatively coupled to the control system, wherein the sensor is configured to monitor an operating parameter of the ride vehicle, wherein the sensor is configured to transmit feedback indicative of the operating parameter, and wherein the control system is configured to output the signal based on the feedback received from the sensor.

18. The ride vehicle of claim 17, wherein the operating parameter is indicative of a position of the ride vehicle, a position of a passenger in the ride vehicle, an operating mode of the ride vehicle, a user input, or any combination thereof.

19. The ride vehicle of claim 14, wherein engagement between the second set of teeth and the first set of teeth enables movement of the restraint piece from the open position to the closed position, but blocks the movement of the restraint piece from the closed position to the open position.

20. The ride vehicle of claim 14, wherein the cap covers the gear in the first configuration.

* * * * *